(12) United States Patent
Krause

(10) Patent No.: US 12,146,319 B2
(45) Date of Patent: Nov. 19, 2024

(54) WALL STUD MEMBER AND WALL CONSTRUCTION USING WALL STUD MEMBERS

(71) Applicant: G. Matt Krause, Allegan, MI (US)

(72) Inventor: G. Matt Krause, Allegan, MI (US)

( * ) Notice: Subject to any disclaimer, the term of this patent is extended or adjusted under 35 U.S.C. 154(b) by 154 days.

(21) Appl. No.: 17/724,467

(22) Filed: Apr. 19, 2022

(65) Prior Publication Data

US 2022/0333375 A1 Oct. 20, 2022

Related U.S. Application Data

(60) Provisional application No. 63/176,769, filed on Apr. 19, 2021.

(51) Int. Cl.
*E04B 2/74* (2006.01)
*E04B 2/76* (2006.01)

(52) U.S. Cl.
CPC .............. *E04B 2/7412* (2013.01); *E04B 2/76* (2013.01)

(58) Field of Classification Search
CPC ........ E04B 2/7412; E04B 2/76; E04B 1/2403; E06B 2001/1942; E06B 2001/2409; E06B 2001/2427; E06B 2001/2424; E06B 2001/2418; E06B 2001/2439; E06B 2001/2436; E06B 2001/2448; E06B 2001/2451; E06B 2001/2454; E06B 2001/2457; E06B 2001/246; E06B 2001/2472; E06B 2001/2475
See application file for complete search history.

(56) References Cited

U.S. PATENT DOCUMENTS

| | | | | |
|---|---|---|---|---|
| 3,332,197 A | * | 7/1967 | Hinkle | E04C 3/06 47/33 |
| 3,954,067 A | * | 5/1976 | Miles | B65D 19/0095 108/57.1 |
| 4,002,000 A | * | 1/1977 | Howard | B21D 47/01 52/842 |
| 5,074,138 A | * | 12/1991 | Miller | B21C 37/124 138/135 |
| 5,158,115 A | * | 10/1992 | Miller | B21C 37/124 138/135 |
| 5,568,714 A | * | 10/1996 | Peterson | E06B 3/66323 52/843 |
| 5,720,144 A | * | 2/1998 | Knudson | E04C 3/291 52/847 |
| 6,158,190 A | | 12/2000 | Seng | |
| 6,519,911 B1 | * | 2/2003 | Sawada | E04C 3/32 52/745.19 |
| 7,178,304 B2 | * | 2/2007 | Brady | E04B 2/7457 52/653.1 |

(Continued)

FOREIGN PATENT DOCUMENTS

| EP | 1124023 A2 | 8/2001 |
|---|---|---|
| JP | H08199732 A | 8/1996 |

*Primary Examiner* — Kyle J. Walraed-Sullivan
(74) *Attorney, Agent, or Firm* — The Watson IP Group, PLC; Jovan N. Jovanovic

(57) ABSTRACT

A wall stud member comprising an inner component and an outer component. The inner and outer components are coupled together. In some configurations, the wall stud member forms a web with an outer flange and an inner flange. The wall stud member may be positioned as a part of a wall construction.

11 Claims, 4 Drawing Sheets

(56) References Cited

U.S. PATENT DOCUMENTS

| | | | | |
|---|---|---|---|---|
| 8,826,616 | B1* | 9/2014 | Gosselin | E06B 3/9616 |
| | | | | 52/309.3 |
| 10,933,455 | B2* | 3/2021 | Miller | B21C 37/121 |
| 2004/0216423 | A1* | 11/2004 | Pieters | E04B 2/7412 |
| | | | | 52/506.01 |
| 2005/0183385 | A1* | 8/2005 | Ohanesian | E04H 17/168 |
| | | | | 52/782.1 |
| 2007/0074480 | A1* | 4/2007 | Kleila | E04H 3/16 |
| | | | | 160/201 |
| 2007/0113506 | A1* | 5/2007 | Denadel | E04C 3/07 |
| | | | | 52/481.1 |
| 2008/0028721 | A1* | 2/2008 | Daniels | A47B 96/1458 |
| | | | | 52/843 |
| 2009/0065134 | A1* | 3/2009 | Jensen | B29C 65/5042 |
| | | | | 156/60 |
| 2009/0126315 | A1* | 5/2009 | Knauf | E04C 3/07 |
| | | | | 52/846 |
| 2012/0117917 | A1* | 5/2012 | Edmondson | E04B 2/7412 |
| | | | | 52/846 |
| 2012/0247059 | A1* | 10/2012 | Daudet | E04B 1/2403 |
| | | | | 52/698 |
| 2018/0010341 | A1* | 1/2018 | Krause | E04F 13/0817 |
| 2019/0316350 | A1* | 10/2019 | Pilz | E04B 1/948 |
| 2020/0291636 | A1* | 9/2020 | Saroka | F16B 5/06 |
| 2022/0220731 | A1* | 7/2022 | Sandler | E04B 2/60 |

* cited by examiner

WALL STUD MEMBER AND WALL CONSTRUCTION USING WALL STUD MEMBERS

CROSS-REFERENCE TO RELATED APPLICATION

This application claims priority from U.S. Provisional Patent App. Ser. No. 63/176,769 filed on Apr. 19, 2021, entitled "WALL STUD MEMBER AND WALL CONSTRUCTION USING WALL STUD MEMBERS", the entire specification of which is hereby incorporated by reference in its entirety.

BACKGROUND OF THE DISCLOSURE

1. Field of the Disclosure

The disclosure relates in general to building materials and more particularly, to a wall stud member, and a wall construction using wall stud members. A method of forming a wall construction is likewise disclosed.

2. Background Art

The forming of walls is well known in the art. Among other structures, typically, a wall is formed through the use of studs which form a frame. Wall coverings (such as outer and inner walls) in the form of drywall, plywood, composite board, particle board, MDF and the like is utilized to cover the frame. Such studs are typically formed from wood or from metal.

Over the years, due to concerns relative to insulation or thermal losses, there has been additional structures in the form of girts and the like have been utilized so as to improve the thermal performance of the studs and walls. There has been an effort to improve the thermal performance of walls and of studs.

SUMMARY OF THE INVENTION

In an aspect of the disclosure, the disclosure is directed to a wall stud member comprising an inner component and an outer component. The inner component has an inner web component. The inner web component comprises an inwardly directed inner flange on at its distal end and an inner coupling portion with inner surface at its proximal end. And, the inner flange has outward surface. The outer component has an outer web component. The outer web component has an inwardly directed outer flange on at its distal end, and an outer coupling portion. The outer coupling portion has at least one overlying portion forming an inner surface. The outer flange comprises an outward surface substantially parallel to the outward surface of the inner flange. Additionally, the inner coupling portion and the outer coupling portion are coupled, so that the inner surface of the overlying portion extends over the inner surface of the inner coupling portion.

In some configurations, the inner coupling portion is coupled to the outer coupling portion through an intermediary component.

In some configurations, the intermediary component comprises a mechanical fastener, comprising at least one of rivets, screws, nuts and bolts.

In some configurations, the intermediary component comprises an adhesive.

In some configurations, the inner coupling portion is coupled to the outer coupling portion through a mechanical coupling.

In some configurations, the inner flange has at its distal end an inwardly directed flange.

In some configurations, the inner flange extends on either side of the inner web component.

In some configurations, the outer flange extends on either side of the outer web component.

In some configurations, the inner coupling portion is substantially coplanar with the inner web component.

In some configurations, the outer coupling portion comprises a pair of overlying portions forming a slot therebetween.

In some configurations, the inner coupling portion is colinear with the inner web component.

In some configurations, one of the pair of overlying portions is colinear with the outer web component such that the outer web component and the inner web component are parallel to each other and offset from one another.

In some configurations, the inner coupling portion has a bend portion, such that the inner web component and the outer web component are colinear and coplanar with each other, and with one of the overlying portions.

In some configurations, the inner coupling portion has bulbous end within the inner surface of the overlying portion and the outer coupling portion has a receiver configured to receive the bulbous end.

In some configurations, the inner web component includes corrugations, and the inner coupling portion has uniform inner surface, configured to couple with overlaying portions.

In some configurations, the corrugations are in the form of a step function.

In some configurations, the corrugations are in the form of a sinusoidal configuration.

In some configurations, the outer component is box-like, comprising an inner wall, side walls and an outer flange spanning therebetween, the inner wall comprising a slot having overlying portions.

In some configurations, the central cavity is filled with insulation.

In some configurations, the central cavity is filled with fire-retardant material.

In some configurations, the pair of overlying portions are centrally disposed relative to the inner wall so as to bisect the wall.

In some configurations, the outer flange comprises inwardly directed tabs that are spaced apart from the surface thereof so as to form a reinforcement channel configured to receive an end wall strip.

In some configurations, the end wall strip is fastened to the outer flange.

In some configurations, one of the overlying portions coincide with the side wall.

In another aspect of the disclosure, the disclosure is directed to a wall construction comprising an outer wall, an inner wall and a plurality of wall stud members and an insulation, wherein the wall stud members are disposed between the outer wall and the inner wall in a spaced apart configuration, and, wherein the insulation is extending between pairs of wall stud members.

In some configurations, the insulation abuts the outer flange and extends along the outer web component, and onto a portion of the inner web component, so that the insulation is spaced apart from the inner flange creating a space between the inner wall and the insulation.

In some configurations, the side wall of the insulation is configured to match the profile of the wall stud member proximate the inner and outer coupling portions so that it lockingly engages the stud member.

In another aspect of the disclosure, the disclosure is directed to method for forming a wall construction comprising pultruding an inner component and an outer component of as disclosed herein, simultaneously through a die.

BRIEF DESCRIPTION OF THE DRAWINGS

The disclosure will now be described with reference to the drawings wherein (and it will be understood that the images may be distorted due to the perspective nature of some of the images (with the understanding that the web is generally perpendicular to each of the flanges in the configurations shown, while due to the perspective nature thereof, may not be evident).

DETAILED DESCRIPTION OF THE DISCLOSURE

Figure 1:
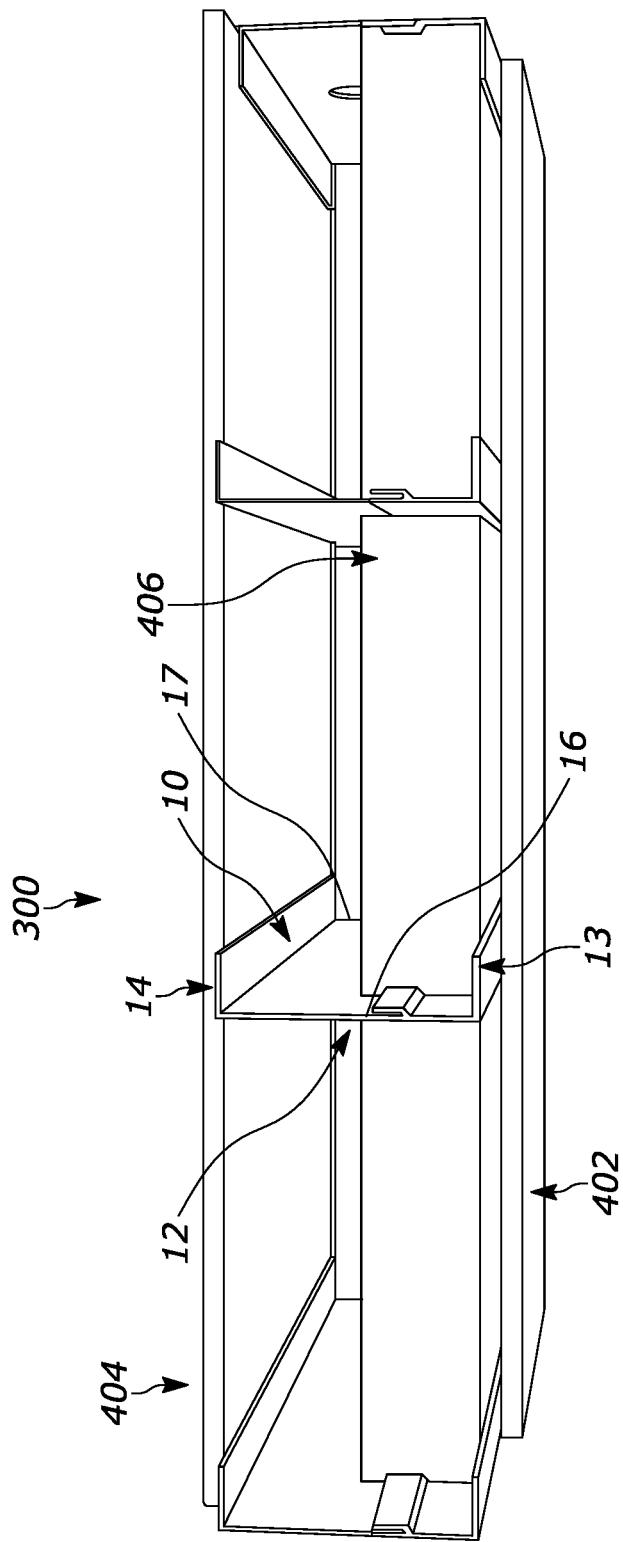
FIG. 1 of the drawings is a cross-sectional view of a wall construction.

While this disclosure is susceptible of embodiment in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, the wall stud member is shown generally at 10. Multiple wall stud members can be utilized to form wall construction 300. The wall stud member can be used in place of a conventional wood or metal stud in wall construction. In certain configurations, the wall stud member can also be utilized as a girt to support cladding that is attached to the outside of a building. It will be understood that when utilized in the place of studs, the use of outer cladding and girts may be omitted in some configurations.

Figure 2:
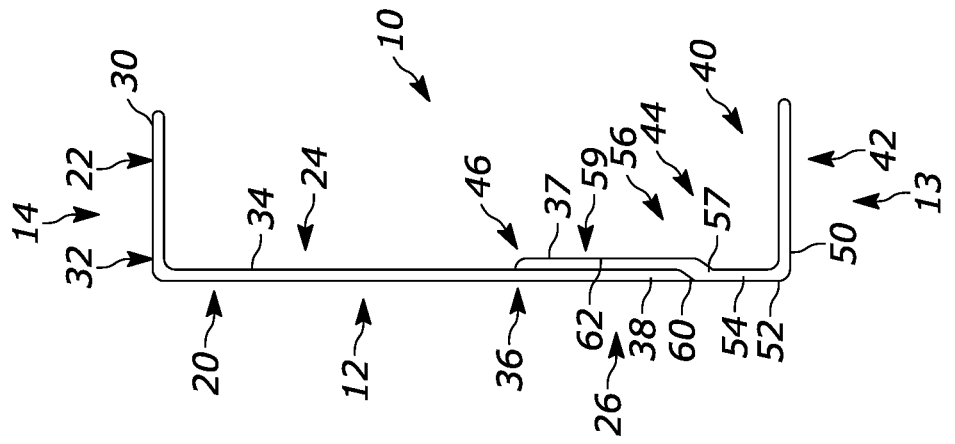
FIG. 2 of the drawings is a cross-sectional perspective view of a configuration of a stud that is usable in the wall construction of FIG. 1, or as a girt.

The wall stud member 10, as shown in FIG. 2 comprises web 12, outer flange 13, inner flange 14, top end 16 and bottom end 17. In the configuration shown, the wall stud member generally forms a C-channel, although I and T constructions are likewise contemplated, as are other structures which will be described hereinbelow. In the configuration shown in FIG. 1, the wall stud member may be formed from an inner component 20 and an outer component 40. The inner component is preferably formed from a galvanized steel, while other configurations, such as other metals and alloys thereof, polymers, composites, wood as well as combinations of the foregoing are likewise contemplated. The outer component is preferably formed from a fiber reinforced polymer, while other constructions are contemplated. The fiber reinforced polymer, may comprise a pultruded fiber reinforced polymer that may include rovings and/or woven fabrics that are embedded in a resin matrix and pultruded through forming dies. Of course, in other configurations, cast or otherwise formed outer components are contemplated.

In the configuration shown, the inner component and the outer component are shown as being formed from a single member. It is contemplated that the inner and/or the outer component may be formed from multiple different components that are coupled together. Additionally, the inner and outer components may be attached together through one or more central components wherein the inner and outer components are therefore indirectly coupled together through an intermediary component.

The inner component, in the configuration of FIG. 2 includes inner flange 22, inner web component 24 and inner coupling portion 26. The inner flange 22 includes outward surface 30 and web root 32. In the configuration shown, the outer surface 30 is substantially planar and the inner flange is of a substantially uniform thickness. It will be understood that the distal end 33 may include an inwardly directed flange that is perpendicular to the inner flange or that is oblique thereto.

The inner web component 24 includes inner end 34 and outer end 36. The inner end 34 meets with the web root 32 of the inner flange. In the configuration shown, the inner flange and the inner web component are perpendicular to each other, with the inner flange extending to one side of the inner web component. In other configurations, the inner flange may extend on either side of the inner web component such that the web root 32 is centrally or in an offset manner positioned opposite the outward surface. In the configuration shown, the inner web component is substantially uniform in thickness and substantially matches the inner flange in thickness.

In the configuration shown, the inner flange and the inner web component are formed from sheet metal in a stamping process. Of course, other configurations are likewise contemplated, such as the formation through extrusion, a press brake, or the like.

The inner coupling portion 26, in the configuration shown, comprises a continuation of the inner web component 24 and includes inner surface 37 and outer surface 38. In the configuration shown, the inner coupling portion is an extension of the inner web component.

The outer component 40 is shown in FIG. 40 as comprising outer flange 42, outer web component 44 and outer coupling portion 46. The outer flange comprises an outward surface 50 and a web root 52. In the configuration shown, the outward surface is substantially uniformly planar, and is substantially parallel to the outward surface 30 of the inner flange. In the configuration shown, dimensionally, the inner flange and the outward flange are mirror images of each other taken generally about a midpoint of the web 12. In some configurations, the outer flange may be on one side of the web, whereas in other configurations, the outer flange may form a "T" with the web or a "T" with one leg of the outer flange being longer or shorter than the other.

The outer web component 44 includes an outer end 54 and an inner end 56. The outer and inner ends are generally coplanar with the inner web component 24 in the configuration shown. In the configuration shown, the outer flange and the outer web component are substantially the same in thickness. Additionally, in the configuration shown, the outer web component is substantially planar overall. It will be understood that in some configurations, the outer web component may be other than planar and may have undulations or surface variations. In still other configurations, as will be explained below, the outer web component may for a box with the outer flange, with structures forming the outer coupling portion.

The outer coupling portion 46 includes a transverse portion 57 and an overlying portion 59. The transverse portion forms a lower flange 60 with the overlying portion forming an inner surface 62. In the configuration shown, the inner coupling portion and the outer coupling portion overly each other. More specifically, the inner surface 62 of the overlying portion 59 extends over the inner surface 37 of the inner coupling portion. The two structures may be coupled together through the use of, for example, fasteners, such as rivets, screws, nuts and bolts, as well as adhesive, as well as mechanical coupling (i.e., mechanical interaction between, for example, the interfacing between structures of an inner component which may be metal with an outer component that may be pultruded or the like). Additionally, combinations of these are likewise contemplated.

Figure 3:
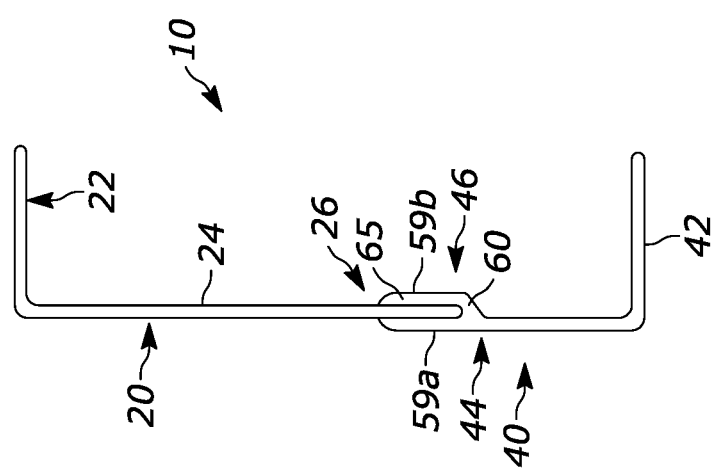
FIG. 3 of the drawings is a cross-sectional perspective view of a configuration of a stud that is usable in the wall construction of FIG. 1, or as a girt.

A number of variations are contemplated to the foregoing. For example, and with reference to FIG. 3, an outer coupling portion may comprise a pair of overlying portions 59a, 59b forming a slot 65 therebetween. In one such configuration, the inner coupling portion 26 is colinear with the inner web component, with one of the pair of overlying portions being colinear with the outer web component such that the outer web component and the inner web component are parallel to each other but offset from one another.

Figure 4:
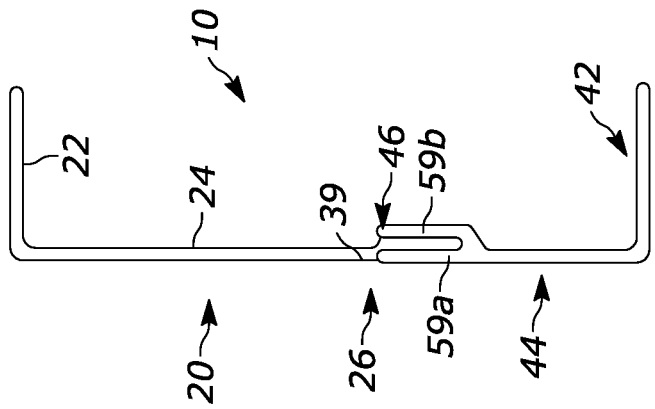
FIG. 4 of the drawings is a cross-sectional perspective view of a configuration of a stud that is usable in the wall construction of FIG. 1, or as a girt.

In another configuration, such as the configuration of FIG. 4, the inner coupling portion may include a bend or transverse portion 39. In such a configuration, the inner web component and the outer web component are colinear and coplanar with each other, as is one of the overlying portions of the pair of overlying portions forming the slot.

It will be understood that in certain configurations, it may be desired that the inner component and the outer component are pultruded simultaneously through a die, even where the inner component comprises a metal member, for example, such that interaction may occur between the inner and outer coupling portions.

Figure 5:
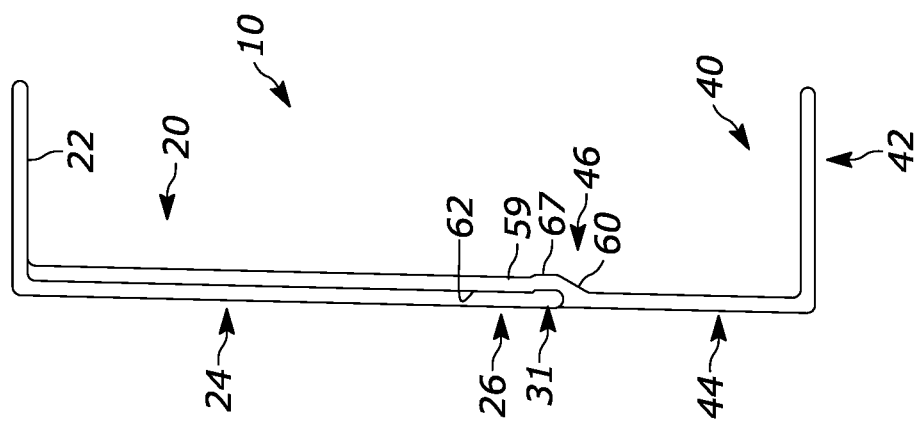
FIG. 5 of the drawings is a cross-sectional perspective view of a configuration of a stud that is usable in the wall construction of FIG. 1, or as a girt.

In the configuration of FIG. 5, the inner coupling portion may include bulbous end 31. The outer coupling may include a receiver 67 for the bulbous end within the inner surface of the overlying portion. In such a configuration, the structures may be co-molded or co-pultruded so as to mechanically lock, in addition, to other locking or joining techniques that are described above with respect to other configurations.

Figure 7:
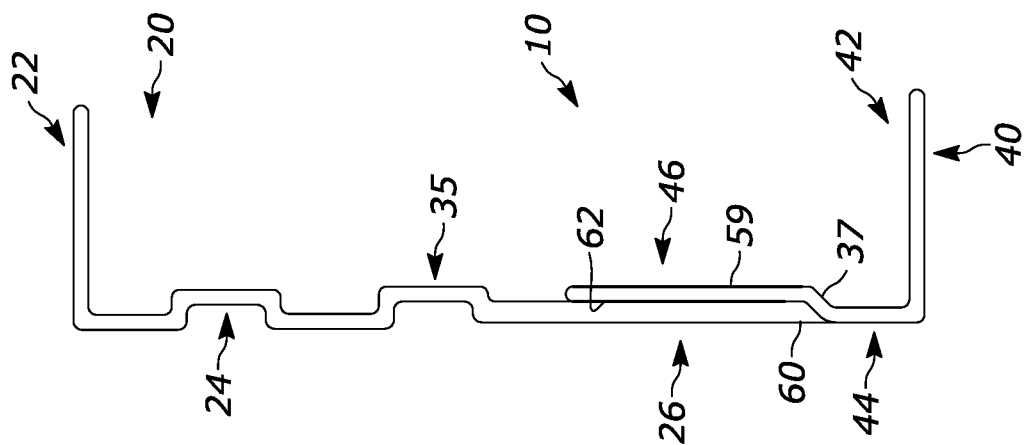
FIG. 7 of the drawings is a cross-sectional perspective view of a configuration of a stud that is usable in the wall construction of FIG. 1, or as a girt.
Figure 6:
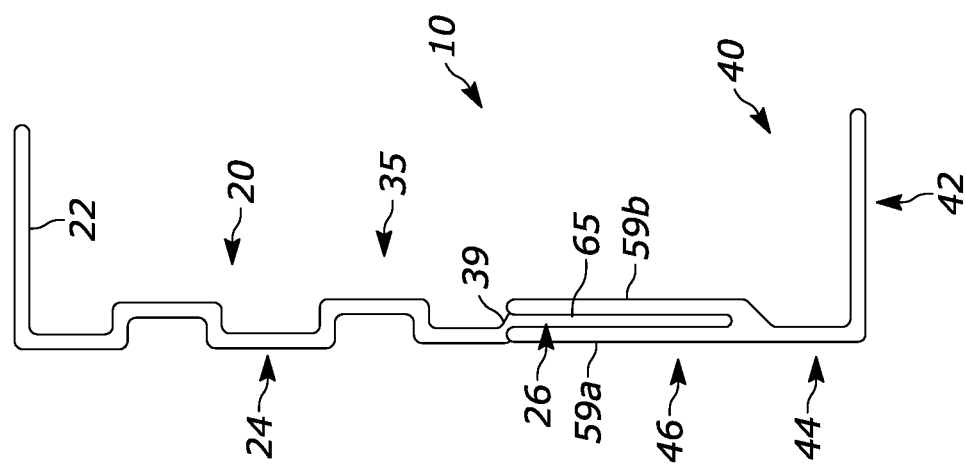
FIG. 6 of the drawings is a cross-sectional perspective view of a configuration of a stud that is usable in the wall construction of FIG. 1, or as a girt.

In the configuration of FIG. 6, the inner web component may include corrugations 35. Such corrugations 35 may be in the form of a step function, a sinusoidal configuration or another, uniform, non-uniform or arbitrary configuration. Such a configuration, when coupled to an offset overlying portion, or slot provides for a uniform inner surface (for example, where an inner surface that is uniform in thickness in portions of the web that comprises the inner web component and the outer web component). In the configuration of FIG. 7, rather than a pair of overlying portions 59a, 59b (as is shown in FIG. 6), a single overlying portion is disclosed. In such a configuration, the inner coupling portion remains substantially planar with the inner web component, with additional corrugations being formed in one direction. To the contrary, in the configuration of FIG. 6, the inner coupling component is offset from the inner web component to the same side as the corrugations 35.

Figure 8:
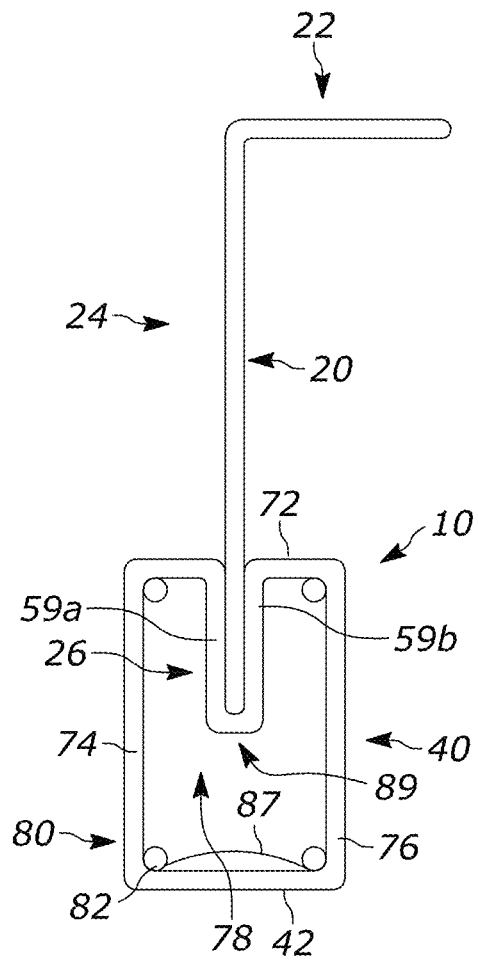
FIG. 8 of the drawings is a cross-sectional perspective view of a configuration of a stud that is usable in the wall construction of FIG. 1, or as a girt.
Figure 9:
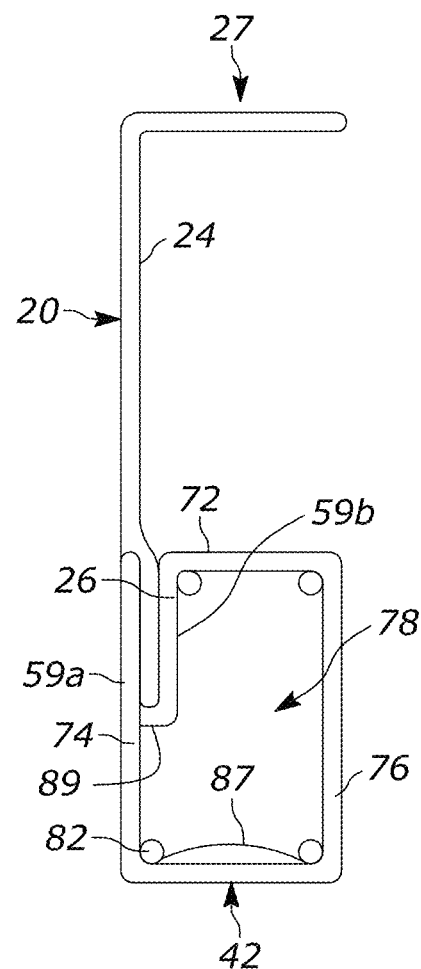
FIG. 9 of the drawings is a cross-sectional perspective view of a configuration of a stud that is usable in the wall construction of FIG. 1, or as a girt.

With reference to FIGS. 8 and 9, the outer component forms a box-like configuration having a web component with an inner wall 72, side walls 74, 76 and terminating with the outer flange 42 spanning therebetween. The box-like configuration defines a central cavity 78. The central cavity 78 may be filled, for example, with insulation and/or fire-retardant materials, such as fire retardant drywall materials, ATH, mineral wool, fiberglass insulation, foam insulation, intumescent materials, among others.

In the configuration of FIG. 8, the pair of overlying portions 59a, 59b may be centrally disposed relative to the inner wall 72 so as to bisect the same (or to be offset in one or the other direction). In the configuration shown, the overlying portions extend partially between the inner wall and the outer flange so as to be spaced apart from the outer flange, and can be joined at a distal end by slot wall 89. The amount of the spacing and whether or not there is a spacing between the pair of overlying portions and the outer flange can be varied depending on the configuration.

Furthermore, in the configuration of FIG. 8 (as well as in other configurations shown herein, without limitation), the outer flange may include inwardly directed tabs 82 that are spaced apart from the inner surface thereof so as to form a reinforcement channel which can receive an end wall strip (also sometimes referred to as an insert member) 87. The end wall strip may comprise a metal member that is slidably received in the channel formed by the tabs and the inner surface of the outer flange. The metal member may comprise a steel member, an aluminum member, or different metal alloys, as well as polymers and composites. In other configurations, the end wall strip may have a non-uniform form that forms around the tabs, or a structure that is adhered or otherwise fastened to the outer flange (on an inner or outer surface thereof). It will be understood that the tabs and the channel may be formed in the outward surface. And, such configurations may be applied to either one or both of the inner our outer surface of the outer flange in any of the configurations shown herein.

In the configuration of FIG. 9, the pair of overlying portions 59a, 59b are offset to one side so that one of the overlying portions coincides with the side wall 74. Otherwise, the structures contemplated with respect to FIG. 8 are equally applicable with FIG. 9.

A completed wall construction 300 is shown in FIG. 1, and includes outer wall 402, inner wall 404, a plurality of wall stud members, and insulation 406 extending between pairs of wall stud members. It is contemplated that the inner wall comprises, for example, a drywall or the like, among other interior surfaces, and the outer wall comprises a plywood, particleboard, fiberboard. The ultimate inner and outer walls (i.e., stucco, stone, wood, siding, among others for the outer wall and drywall, tile, stone, among others for the inner wall) may be varied without limitation.

In the configuration shown, the insulation abuts the outer flange and extends along the outer web component, and onto a portion of the inner web component. In turn, the insulation is spaced apart from the inner flange creating a space between the inner wall 404 and the insulation 406. In addition, the inner and/or outer coupling portions can be utilized to locate the insulation in the proper orientation. For example, in the configuration shown, the side wall 408 of the insulation may have a surface configuration that matches the profile of the wall stud member proximate the inner and outer coupling portions so as to lockingly engage the same when installed. It is contemplated that the insulation may comprise any number of different types of insulation, including, foam (cut or blown), mineral wool, fiberglass insulation, among others.

It is contemplated that the entirety of the space between the inner and outer walls may be filled with insulation or the entire area bound by the inner flange and the outer flange may be filled with insulation. Additionally, it is contemplated that openings for plumbing, wiring or the like may be made through the web of the wall stud member (either one or both of the inner component and the outer component). Openings may likewise be presented through the inner and outer flanges.

While such a construction is shown as being a replacement for conventional metal and wood studs, it is likewise contemplated that the wall stud members may be utilized in the place of girts on the outside of a building upon which cladding is installed. Variations to the foregoing constructions (including mixing and matching features) is likewise contemplated.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A wall stud member comprising an elongated member having a substantially uniform cross-sectional configuration along a length thereof, the wall stud member comprising:
   an inner component having an inner web component, the inner web component comprising an inwardly directed inner flange at a distal end of the inner web component and an inner coupling portion with an inner surface at a proximal end of the inner web component, wherein the inwardly directed inner flange comprises outward surface, the inner component comprising a metal member; and
   an outer component, having an outer web component, the outer web component comprising an inwardly directed outer flange on at a distal end of the outer web component, a first side wall and a second side wall spaced apart from the first side wall, the first side wall and the second side wall each extending from the outer flange toward the inner component, with the outer flange spanning between the first side wall and second side wall, and an inner wall spanning between the first side wall and the second side wall, and an outer coupling portion, the outer coupling portion having a pair of overlying portions, a first overlying portion of the pair of overlying portions being one of defined by the first side wall and a first overlying wall depending from the inner side wall, with a second overlying portion of the pair of overlying portions defined by a second overlying wall depending from the inner wall, each of the first overlying portion and the second overlying portion forming an inner surface so as to define a slot therebetween, with a slot surface joining the pair of overlying portions opposite the inner wall, to form a box defining a central cavity, with the inner wall and the slot surface together with the first overlying portion and the second overlying portion coupling the first side wall and the second side wall opposite the inwardly directed outer flange, wherein the inwardly directed outer flange comprises an outward surface substantially parallel to the outward surface of the inwardly directed inner flange, the outer component comprising a fiber reinforced polymer material having a plurality of at least one of rovings and woven fabrics embedded within a resin matrix;
   wherein the inner coupling portion and the outer coupling portion are coupled, by directing the inner coupling portion into the slot between the first overlying portion and the second overlying portion so that the inner surface of the overlying portion extends over the inner surface of the inner coupling portion.

2. The wall stud member according to claim 1 wherein the inner coupling portion is coupled to the outer coupling portion through an intermediary component.

3. The wall stud member according to claim 2 wherein the intermediary component comprises a mechanical fastener, comprising at least one of rivets, screws, nuts and bolts.

4. The wall stud member according to claim 2 wherein the intermediary component comprises an adhesive.

5. The wall stud member according to claim 1 wherein the inner coupling portion is coupled to the outer coupling portion through a mechanical coupling.

6. The wall stud member according to claim 1 wherein the central cavity is filled with insulation.

7. The wall stud member according to claim 1 wherein the central cavity is filled with fire-retardant material.

8. The wall stud member according to claim 1 wherein the pair of overlying portions are centrally disposed relative to the inner wall so as to bisect the inner wall.

9. The wall stud member according to claim 1 wherein an end wall strip, comprising a metal member extends along an inner surface of the inwardly directed outer flange.

10. The wall stud member according to claim 1 wherein the outer flange, the slot surface and the inner wall are substantially parallel to each other.

11. The wall stud member according to claim 9 wherein the inwardly directed outer flange includes a pair of inwardly directed tabs on the inner surface thereof defining a reinforcement channel, with the end wall strip being slidably positionable within the reinforcement channel.

* * * * *